US011202194B1

(12) United States Patent
Dawson et al.

(10) Patent No.: US 11,202,194 B1
(45) Date of Patent: Dec. 14, 2021

(54) RADIO ACCESS NETWORK (RAN) AFFILIATION LIST PROPAGATION

(71) Applicant: T-MOBILE INNOVATIONS LLC, Overland Park, KS (US)

(72) Inventors: Peter P. Dawson, Portsmouth, NH (US); Ronald R. Marquardt, Woodinville, WA (US); Mark A. Moore, Franklin, TN (US); Lyle W. Paczkowski, Mission Hills, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/869,319

(22) Filed: May 7, 2020

(51) Int. Cl.
*H04W 8/14* (2009.01)
*H04W 4/06* (2009.01)
*H04W 12/06* (2021.01)
*H04W 60/00* (2009.01)

(52) U.S. Cl.
CPC ............. *H04W 8/14* (2013.01); *H04W 4/06* (2013.01); *H04W 12/06* (2013.01); *H04W 60/00* (2013.01)

(58) Field of Classification Search
CPC ......... H04W 8/14; H04W 4/06; H04W 60/00; H04W 12/06
See application file for complete search history.

(56) References Cited

U.S. PATENT DOCUMENTS

| 9,282,898 | B2 | 3/2016 | McRoberts et al. | |
|---|---|---|---|---|
| 2005/0213566 | A1* | 9/2005 | Jutila | H04W 48/18 370/352 |
| 2014/0357285 | A1* | 12/2014 | Smith | H04W 16/14 455/450 |
| 2016/0044591 | A1* | 2/2016 | Pao | H04W 48/12 370/329 |
| 2018/0103416 | A1* | 4/2018 | Brown | H04W 48/10 |

* cited by examiner

Primary Examiner — Brandon J Miller

(57) ABSTRACT

A method of propagating a radio access network (RAN) affiliation list to mobile communication devices, where the RAN affiliation list informs the mobile communication devices what cell site they are to attach to and what radio frequencies they are to use. The method comprises receiving a RAN affiliation list by a cell site, where the RAN affiliation list has a RAN affiliation list identity and comprises information about cell site affiliation for mobile communication devices that is applicable to an operating area including the cell site, transmitting the RAN affiliation list identity by the cell site on a broadcast channel, receiving by the cell site a request to download the RAN affiliation list, transmitting the RAN affiliation list by the cell site, receiving a wireless communication service request by the cell site, authorizing the wireless communication service request by the cell site based on the RAN affiliation list.

20 Claims, 7 Drawing Sheets

RADIO ACCESS NETWORK (RAN) AFFILIATION LIST PROPAGATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices are widely deployed and used by people in all walks of life in the United States and other nations. Mobile communication devices provide both voice communication services and data communication services. People can hold voice conversations with others via their mobile communication devices. People can access the Internet and download content via browsers executing on their mobile communication devices. Additionally, mobile applications or computer programs may be installed on the mobile communication device. When executed, the mobile applications may process autonomously on the mobile communication device. The mobile applications may also interact with application servers that assist the mobile applications in some ways. In some cases, the mobile application may be deployed as a client having limited capabilities that executes on the mobile communication device that interworks with a server application that executes on a server computer accessible via a wireless connection from the mobile communication device. Mobile communication devices may have an operating system installed that provides an execution environment. This operating system may constrain or limit what mobile applications are able to do.

SUMMARY

In an embodiment, a method of propagating a radio access network (RAN) affiliation list to mobile communication devices, where the RAN affiliation list informs the mobile communication devices what cell site they are to attach to and what radio frequencies they are to use is disclosed. The method comprises receiving a first RAN affiliation list by a cell site, where the RAN affiliation list has a first RAN affiliation list identity and comprises information about cell site affiliation for mobile communication devices that is applicable to an operating area including the cell site and transmitting the first RAN affiliation list identity by the cell site on a broadcast channel. The method further comprises receiving a request to download the first RAN affiliation list by the cell site from a first mobile communication device and transmitting the first RAN affiliation list by the cell site to the first mobile communication device. The method further comprises receiving a wireless communication service request by the cell site from a second mobile communication device, where the wireless communication service request is for a voice communication service or for a data communication service, authorizing the wireless communication service request from the second mobile communication device based on the first RAN affiliation list, and providing wireless communication service by the cell site to the second mobile communication device.

In another embodiment, a cell site for propagating a radio access network (RAN) affiliation list to mobile communication devices, where the RAN affiliation list informs the mobile communication devices what cell site they are to attach to and what radio frequencies they are to use is disclosed. The cell site comprises a radio transceiver coupled to the antenna, a processor coupled to the radio transceiver, a non-transitory memory coupled to the processor, and an application stored in the non-transitory memory. When executed by the processor, the application receives a first RAN affiliation list, where the second RAN affiliation list has a first RAN affiliation list identity and comprises information about cell site affiliation for wireless communication devices that is applicable to an operating area including the cell site and transmits the first RAN affiliation list identity via the radio transceiver on a broadcast channel. The application further receives a request to download the first RAN affiliation list via the radio transceiver from a first mobile communication device and transmits the first RAN affiliation list via the radio transceiver to the first mobile communication device. The application further receives a wireless communication service request via the radio transceiver from a second mobile communication device, where the wireless communication service request is for a voice communication service or for a data communication service, authorizes the wireless communication service request from the second mobile communication device based on the first RAN affiliation list, and provides wireless communication service via the radio transceiver to the second mobile communication device.

In yet another embodiment, a mobile communication device is disclosed. The mobile communication device comprises a radio transceiver, a non-transitory memory, a processor, and an application stored in the non-transitory memory. When executed by the processor, the application monitors a broadcast channel of a first cell site via the radio transceiver, receives a first radio access network (RAN) affiliation list identity on the broadcast channel of the first cell site via the radio transceiver, and determines that the non-transitory memory does not store a RAN affiliation list associated with the first RAN affiliation list identity. The application further sends a request for a RAN affiliation list associated with the first RAN affiliation list identity via the radio transceiver to the first cell site, receives a first RAN affiliation list associated with the first RAN affiliation list identity via the radio transceiver from the first cell site, stores the first RAN affiliation list in the non-transitory memory, and initiates wireless communication between the radio transceiver and the first cell site based on the first RAN affiliation list.

In yet another embodiment, a computer system for managing a plurality of radio spectrum license micro-auctions is disclosed. The system comprises a trusted data store comprising a record of auction bids and auction results for a plurality of micro-auctions of radio spectrum licenses, where each micro-auction pertains to a temporary allocation of a predefined radio spectrum frequency band license for a predefined usage area, a processor, a non-transitory memory, and a radio spectrum license micro-auction application stored in the non-transitory memory. When executed by the processor, the radio spectrum license micro-auction application, for each different micro-auction, retrieves bids stored in the trusted data store associated with the micro-auction and, for each bid, determining that a bidder associated with the bid has funds on deposit in a depository sufficient to cover the bid. The radio spectrum license micro-auction application further, for each different micro-auction determines a bid winner, for each bid winner, debits the funds on deposit associated with the bid winner in the amount of the winning bid, and, for each micro-auction stores a record of the bid winner in the trusted data store, whereby a wireless communication service provider is notified of having won the micro-auction by reading the record of the bid winner from the trusted data store.

In yet another embodiment, a method of bidding for a plurality of radio spectrum licenses in a plurality of radio spectrum license micro-auctions is disclosed. The method comprises submitting a plurality of bids for radio spectrum licenses by a bidding application executing on a computer to a trusted data store via a trusted communication channel, wherein each bid pertains to a temporary allocation of a predefined radio spectrum frequency band license for a predefined usage area, determining by the bidding application that a bid for temporary allocation of radio spectrum frequency band license for a usage area has been won, and sending notification of the temporary allocation of radio spectrum frequency band license for the usage area associated with the winning bid by the bidding application to a plurality of cell sites, wherein the cell sites are located in the usage area associated with the usage area.

In yet another embodiment, a computer system for bidding for a plurality of radio spectrum licenses in a plurality of radio spectrum license micro-auctions is disclosed. The system comprises a processor, a non-transitory memory, and a bidding application stored in the non-transitory memory. When executed by the processor, the bidding application evaluates current wireless communication traffic loads in a plurality of different usage areas and projects a demand for wireless communication service in the usage areas in a next radio spectrum license allocation period based on evaluating the current wireless communication traffic loads. The bidding application further, for each of a plurality of different radio spectrum license micro-auctions associated with the usage areas, determines a bid for the radio spectrum license micro-auction based on projecting the demand for wireless communication service in the usage area and sends the bids for the radio spectrum license micro-auctions to a radio spectrum license micro-auction system. The bidding application further retrieves results of the bids for the radio spectrum license micro-auctions from the radio spectrum license micro-auction system and sends notification of radio spectrum license allocations associated with the usage areas based on the results of the bids for the radio spectrum license micro-auctions to a plurality of cell sites.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
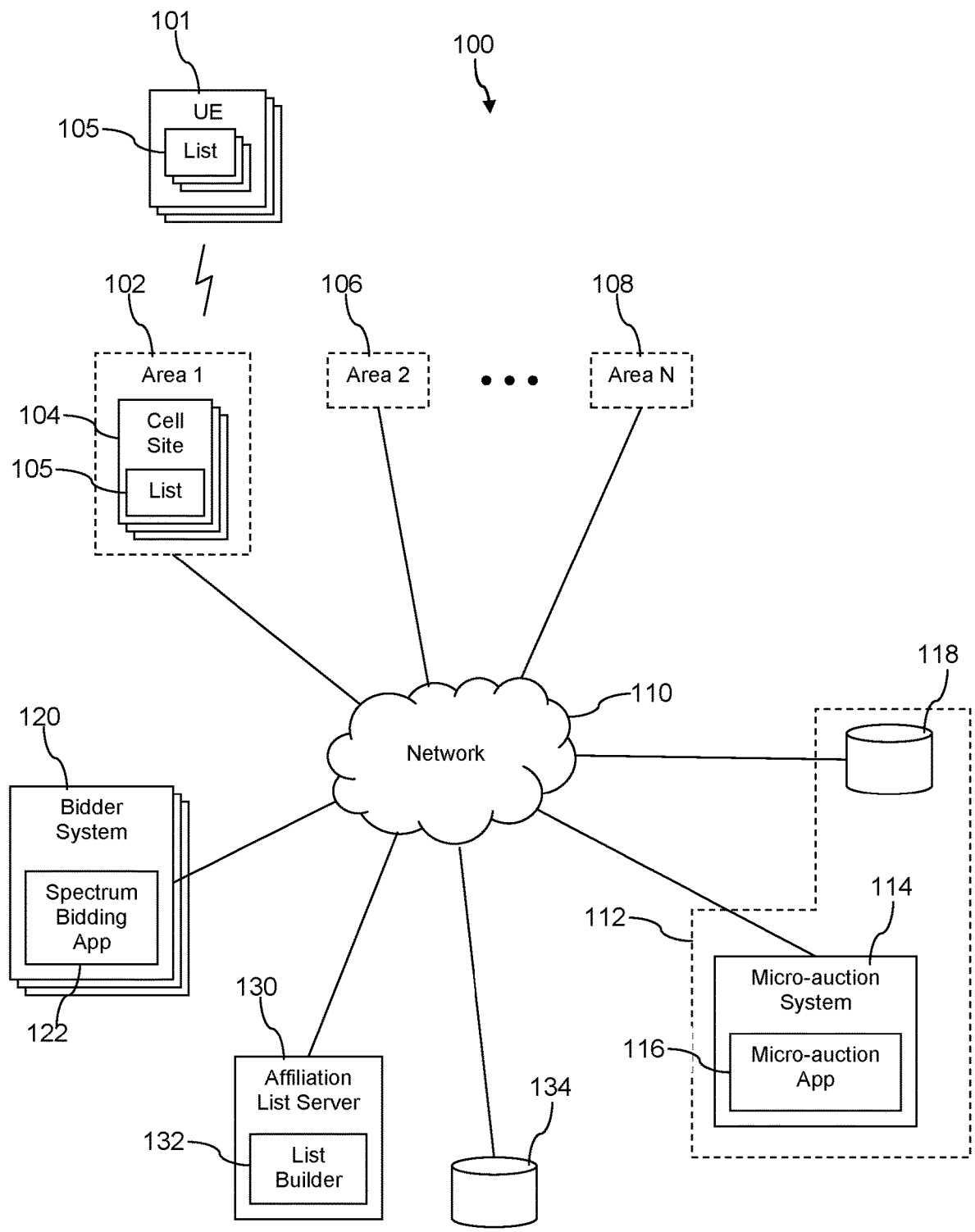
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Traditionally cellular radio spectrum has been licensed to wireless communication service providers through a cumbersome process involving sealed bids and long-duration licenses, for example a 5 year license time-duration or a 10 year license time-duration. Additionally, the radio spectrum licenses have traditionally related to large regions over which the radio spectrum license applied. The radio spectrum licenses covered relatively broad continuous bands of radio frequency. The current disclosure contemplates a new system of radio spectrum licensing managed by a computerized bidding framework that promotes sub-dividing licenses into finer grained licenses—what is referred to herein as micro-auctions. A problem arises of how to timely and securely inform wireless communication devices (e.g., cell phones and other devices) of changed radio access network (RAN) associations or RAN affiliations when these RAN affiliations change frequently as a result of micro-auctions.

Traditionally, wireless communication devices have been configured somewhat statically with information that indicates what frequencies and what cell sites the devices may use to access the RAN. Some of that information may be configured into the devices as preferred roaming lists (PRLs). Traditionally, pushing out PRLs may be time consuming and hence occur rarely or moderately rarely. To avoid overloading the RAN pushing out updates of changed RAN affiliations, the present disclosure teaches pushing RAN affiliation information out to the cell sites, and delegating to the cell sites promulgating the RAN affiliation information to wireless communication devices. The RAN affiliation information may be stored in RAN affiliation lists. These RAN affiliation lists may be stored in a file format or in a bundle format.

In traditional pushing of PRL updates, PRLs flowed through the cell sites, also, but the cell sites were simply communication nodes in this traditional approach. As taught herein, the cell sites will implement a new method or function of interaction with mobile communication devices to propagate only RAN affiliation information that is locally relevant. The RAN affiliation information will not be the same across a national RAN but will be customized and reduced to contain the RAN affiliation information that is relevant to a limited local domain and not contain RAN affiliation information that is associated with other domains. By sending only locally relevant RAN affiliation information, the volume of information sent to each device in one update will be very much reduced relative to traditional PRL updates, which can compensate or offset the increased frequency of updates of RAN affiliation information.

A RAN affiliation list comprises information that mobile communication devices may use to attach to and communicate via cell sites in a localized operational area. The RAN affiliation list identifies cell sites that may be used and frequencies that may be used by those cell sites. The RAN affiliation list contain this information for all cell sites within its operational area, including those cell sites belonging to different wireless communication service providers and/or different mobile virtual network operators (MVNOs). The RAN affiliation list may identify the wireless communication service provider and/or MVNO that operates each cell site, whereby the mobile communication device can determine what cell site to attach to (e.g., a cell site operated by a service provider or MVNO which the device is affiliated to, for example by virtue of an active service subscription). The RAN affiliation list is relatively modest in size because it only comprises RAN affiliation information for the local operational area, for example the local township area, the local county area, the local metropolitan area, or the local state area, not the entirety of the Pacific-Northwest, for example.

The cell sites will broadcast the identity of the locally applicable RAN affiliation list on a broadcast channel that all wireless communication devices listen to, for example a paging channel. If a wireless communication device determines that it is not currently provisioned with the RAN affiliation list identified by the broadcast channel, the device initiates a RAN affiliation list download process with the cell site, for example by sending a RAN affiliation list request message containing the subject identity of the RAN affiliation list. The cell site downloads the RAN affiliation list to the requesting device. The requesting device stores the RAN affiliation list and thereafter uses that RAN affiliation information stored in the RAN affiliation list to know what frequency bands it is to use and what cell sites it is authorized to attach to. The RAN affiliation information stored in the RAN affiliation list may comprise information about roaming to support roaming within the local area (local to the subject RAN affiliation information, not necessarily local to a "home network area" of a wireless communication service provider).

As a wireless communication device moves, for example as a user of the device drives in a vehicle, and the device leaves coverage of one cell site and enters the coverage of another cell site, the device continues to monitor the broadcast channel to remain informed of the identity of the locally relevant RAN affiliation list. If the device moves into coverage of a cell site that broadcasts a different RAN affiliation list identity, the device repeats initiation of the RAN affiliation list download process and downloads and stores the locally relevant RAN affiliation list. The devices may store a plurality of RAN affiliation lists. Because devices may spend most of their time in a moderately limited geographic area, once the devices have been updated with RAN affiliation lists they may not need to be updated again unless they undertake extended travel or when micro auctions have driven change to one or more of the RAN affiliation list.

The cell sites may be updated with new RAN affiliation lists as micro-auctions are completed and new allocations of radio spectrum licenses are activated. New RAN affiliation lists are given different identities, thereby allowing different RAN affiliation lists to be distinguished from each other. The cell site manages its frequency usage based on the currently active RAN affiliation list. Different RAN affiliation lists may cause the cell site to stop using some wireless frequencies it previously had used and start using other wireless frequencies it did not formerly use. If a wireless communication device attempts to attach to the cell site using an out-of-date RAN affiliation list, the cell site may not authorize the device for attachment. This may be a signal to the wireless communication device that was denied attachment to initiate a RAN affiliation list download request.

The radio spectrum license may be sub-divided into shorter-term licenses: radio spectrum licenses that last for one year or less, for six months or less, for three months (i.e., a quarter) or less, for one month or less, for one week or less, for one day or less, for one hour or less, or some other predefined duration of time. The radio spectrum license may be sub-divided into smaller areas. For example, separate licenses may be allocated for different states, for different cities, for different counties, and for different townships. For example, separate licenses may be allocated for each of 20 different areas of Chicago, 30 different areas of New York City, and 10 different areas of Dallas. The radio spectrum licenses may be sub-divided into smaller contiguous radio spectrum frequency bands. In some cases, the radio spectrum licenses may be sub-divided into smaller time duration licenses, smaller regional areas, and smaller contiguous radio spectrum frequency bands.

Such micro-auctions may provide a plurality of advantages, both to the manager of the radio spectrum asset (e.g., the United States government or other governing entity) and to the wireless communication service providers. Micro-auctions can track an intrinsic value of the radio spectrum assets more accurately than the conventional radio spectrum license auctions. If the value of radio spectrum increases, this can be more promptly monetized for the benefit of the commons—for example the American people. On the other hand, wireless communication service providers may bid more rationally and more in keeping with their true business needs. For example, a wireless service provider would not need to bid for spectrum with a view to maximum traffic loads and then have to carry the extra cost of unneeded radio spectrum during off-peak wireless communication traffic cycles. This "just-in-time" bidding and "just enough" bidding could promote a more rational and equitable distribution of radio resources.

The micro-auction manager (e.g., the US government) can manage each micro-auction independently. Each micro-auction can define the associated radio spectrum license time-duration, the associated usage area, the associated radio spectrum, and different micro-auctions may define different license durations and different scale usage areas and different bandwidth radio spectrums (e.g., the micro-auction licenses could vary in granularity from one license to the next). Thus, in a first licensing cycle, a first set of usage areas may be defined and for a second, later licensing cycle, a second set of different usage areas may be defined. Said in other words, the boundaries between usage areas may be redrawn from licensing cycle to licensing cycle. In the first licensing cycle, a first set of radio spectrum frequency bands may be defined and for the second licensing cycle, a second set of radio spectrum frequency bands different from the first set may be defined. The redefinition of usage areas and radio spectrum frequency bands can promote adapting the management of the radio spectrum resources by the micro-auction manager more suitably to changing user residence patterns, movement patterns, and usage patterns.

The micro-auction manager can store definitions and/or terms and conditions of micro-auctions in a data store that is accessible to qualified bidders. Alternatively or additionally, the micro-auction manager may promulgate announcements comprising the definitions and/or terms and conditions of micro-auctions. Qualified bidders may be required to maintain a minimum funds balance in a fund depository managed by and accessible to the micro-auction manager. Qualified bidders may be subjected to other requirements, such as a clean record of radio operation over recent operating history and other criteria.

In an embodiment, the process of receiving micro-auction bids, recording micro-auction bids, evaluating micro-auction bids, and announcing the results of micro-auctions may be conducted via end-to-end trusted communication links between the bidders and the micro-auction manager. Trusted communication may take place between computer systems executing in a trusted security zone—a form of hardware assisted security described further hereinafter. Trusted communication is discussed at greater length in U.S. Pat. No. 9,282,898, filed Jun. 25, 2012, entitled "End-to-end Trusted Communications Infrastructure," by Leo Michael McRoberts, et al., which is hereby incorporated by reference in its entirety. In an embodiment, records of the micro-auction bids and of the micro-auction results are stored in a blockchain and/or hyperledger in a data store, whereby the transactions of the micro-auctions may be securely and incorruptibly stored. In an embodiment, the blockchain may be maintained collaboratively by the qualified bidders and by the micro-auctions manager. A plurality of copies of the blockchain may be stored in computer systems maintained by the qualified bidders and the micro-auctions manager, for example within a secure computer network domain established with a virtual private network (VPN).

The disclosure further teaches a system and method for timely updating RAN affiliation lists in accordance with completion of micro-auctions and propagating the RAN affiliation packages to the cell sites as described above. In an embodiment, RAN affiliation lists updated based on the results of the micro-auction bids may be transmitted out from a central system, for example a server computer, to cell sites via end-to-end trusted communication links between the central system and the cell sites.

A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main mobile device operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. For more details on establishing trusted end-to-end communication links relying on hardware assisted security, see U.S. Pat. No. 9,282,898, filed Jun. 25, 2012, entitled "End-to-end Trusted Communications Infrastructure," by Leo Michael McRoberts, et al. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

Turning now to FIG. 1, a system 100 is described. In an embodiment, system 100 comprises a first RAN area 102 comprising a plurality of cell sites 104. The system 100 further comprises a second RAN area 106 and a third RAN area 108. Each of the second RAN area 106 and the third RAN area 108 comprises a plurality of cell sites. The system 100 may comprise any number of RAN areas and each RAN area may comprise any number of cell sites. Each RAN area 102, 106, 108 may comprise cell sites 104 owned and operated by different wireless communication service provider (e.g., in an operating area where two or more service providers compete for the same wireless communication service subscribers). A RAN area may be referred to as an operating area in some contexts.

The RAN areas 102, 106, 108 are associated with area-wise partitioning of wireless spectrum licensing. Said in another way, the wireless spectrum license allocated by the radio spectrum allocation authority 112 in RAN area 102 is independent from the wireless spectrum licenses allocated by the radio spectrum allocation authority 112 in second RAN area 106 and the third RAN area 108. The wireless spectrum license allocated by the radio spectrum allocation authority 112 in the second RAN area 106 is independent from the wireless spectrum licenses allocated by the spectrum allocation authority in the first RAN area 102 and the third RAN area 108. The wireless spectrum license allocated by the radio spectrum allocation authority 112 in the third RAN area 108 is independent from the wireless spectrum licenses allocated by the radio spectrum allocation authority 112 in the first RAN area 102 and the second RAN area 106. The boundaries of the RAN areas 102, 106, 108 may change from micro-auction cycle to micro-auction cycle.

The cell sites of the RAN areas 102, 106, 108 establish wireless communication links with mobile communication devices (e.g., smart phones, wearable computers, laptop computers, Internet of things (IoT) devices, and others) and provide those devices with communication connectivity to a network 110. For example, the cell site 104 provides wireless communication links to a mobile communication device 101. The mobile communication device is one of a mobile phone, a personal digital assistant (PDA), a smart phone, a wearable computer, a headset computer, a laptop computer, a notebook computer, or a tablet computer. The cell sites of the RAN areas 102, 106, 108 may provide wireless communication links to communication devices according to a 5G wireless protocol, a long term evolution (LTE) wireless protocol, a code division multiple access (CDMA) wireless protocol, a global system for mobile communication (GSM) wireless protocol, or another wireless protocol. The network 110 comprises one or more public networks, one or more private networks, or a combination thereof.

The cell sites 104 may store a RAN affiliation list 105 that comprises information that mobile communication devices (user equipment—UE) 101 may use to attach to and communicate via cell sites in a localized operational area. The RAN affiliation list 105 identifies cell sites 104 associated with or located within the RAN area (e.g., the cell sites 104 located within the first RAN area 102) that may be used and frequencies that may be used by those cell sites 104. The RAN affiliation list 105 contain this information for all cell sites 104 within its associated RAN area, including those cell sites 104 belonging to different wireless communication service providers and/or different mobile virtual network operators (MVNOs). The RAN affiliation list 105 may identify the wireless communication service provider and/or MVNO that operates each cell site 104, whereby the mobile communication device 101 can determine what cell site 104 to attach to (e.g., a cell site 104 operated by a service provider or MVNO which the mobile communication device 101 is affiliated to, for example by virtue of an active service subscription) and what frequencies to use. The RAN affiliation list 105 is relatively modest in size because it only comprises RAN affiliation information for the local operational area, for example the local township area, the local county area, the local metropolitan area, or the local state area, not the entirety of the Pacific-Northwest, for example. The cell site 104 uses the RAN affiliation list 105 that is applicable to its RAN area 102, 106, 108 to know what frequencies to use. The cell site 104 may be said to use the RAN affiliation list 105 to authorize wireless communication service requests received from mobile communication devices.

The cell sites 104 will broadcast the identity of the locally applicable RAN affiliation list 105 on a broadcast channel that all mobile communication devices 101 listen to, for example a paging channel. In an embodiment, the cell sites 104 broadcast the identity of the locally applicable RAN affiliation list 105 periodically, for example about once every 5 seconds, about once every 10 seconds, about once every 15 seconds, about once every 30 seconds, about once every minute, or at some other periodic interval. In an embodiment, the cell sites 104 broadcast the identity of the locally applicable RAN affiliation list 105 using less than about 20% of the throughput capacity of the broadcast channel, less than about 10% of the throughput capacity of the broadcast channel, or less than about 5% of the throughput capacity of the broadcast channel.

The mobile communication devices 101 monitor the broadcast channel and receives the RAN affiliation list identity from the broadcast channels of proximate cell sites 104. If a mobile communication device 101 determines that it is not currently provisioned with the RAN affiliation list 105 identified by the broadcast channel, the mobile communication device 101 initiates a RAN affiliation list 105 download process with the cell site 104, for example by sending a RAN affiliation list request message containing the subject identity of the RAN affiliation list 105. In an embodiment, the mobile communication device 101 does not send the identity of the RAN affiliation list 105, as this may be considered redundant information, the expectation being the mobile communication device 101 is requesting the RAN affiliation list 105 that is active for the cell site 104 to which it makes the request. The cell site 104 downloads the RAN affiliation list 105 to the requesting mobile communication device 101. The requesting mobile communication device 101 stores the RAN affiliation list 105 and thereafter uses that RAN affiliation information stored in the RAN affiliation list 105 to know what frequency bands it is to use and what cell sites it is authorized to attach to. The RAN affiliation information stored in the RAN affiliation list 105 may comprise information about roaming to support roaming within the local area (local to the subject RAN affiliation information, not necessarily local to a "home network area" of a wireless communication service provider).

As a wireless communication device 101 moves, for example as a user of the device drives in a vehicle, and the device leaves coverage of one cell site 104 and enters the coverage of another cell site 104, the mobile communication device 101 continues to monitor the broadcast channel to remain informed of the identity of the locally relevant RAN affiliation list 105. If the mobile communication device 101 moves into coverage of a cell site 104 that broadcasts a different RAN affiliation list identity, the mobile communication device 101 repeats initiation of the RAN affiliation list download process and downloads and stores the locally relevant RAN affiliation list 105. The mobile communication devices 101 may store a plurality of RAN affiliation lists 105. Because mobile communication devices 101 may spend most of their time in a moderately limited geographic area, once the devices have been updated with RAN affiliation lists 105 applicable with their customary ambit, they may not need to be updated again unless they undertake extended travel or when micro auctions have driven change to one or more of the RAN affiliation list 105.

The system 100 further comprises a micro-auction system 114 that executes a micro-auction application 116 and a data store 118. The micro-auction system 114 and the data store 118 may be maintained, operated, and secured by a radio spectrum allocation authority 112, for example the US government or the Federal Communications Commission (FCC). The micro-auction application 116 conducts a plurality of micro-auctions that are participated in by a plurality of bidder systems 120 each executing a radio spectrum bidding application 122.

The micro-auction application 116 may determine how long radio spectrum license allocations are to last, what the usage areas are to be, and what the frequency bandwidths are to be. Said in other words, the micro-auction application 116 may determine the granularity of the radio spectrum license allocations and may vary that granularity between different radio spectrum licenses. The micro-auction application 116 may take into consideration changing user residence patterns, changing user travel patterns, changing user usage patterns, and other phenomenon to better adapt the radio spectrum allocations to serve the interests of stakeholders such as citizens and businesses. The micro-auction application 116 may stagger the micro-auction timing and/or the radio spectrum license durations with reference to usage areas so that proximate usage areas are not associated with licenses expiring at the same time.

The micro-auction application 116 may promulgate announcements of forthcoming micro-auctions to the bidder systems 120 and/or the radio spectrum bidding applications 122. These announcements comprise the terms of the associated micro-auction: when the bidding process of the micro-auction opens, when the bidding process of the micro-auction closes, when the result of the micro-auction is deemed active (when the radio spectrum license is deemed to go active and when the radio spectrum license is deemed expired), what usage area is covered by the micro-auction, what radio spectrum frequency band is covered by the micro-auction. The announcements may be sent out for every instance of micro-auctions. Alternatively, the announcement may be sent once and identify a repeating period of the micro-auctions. Such an announcement would be considered operable until a countervailing announcement is sent out. Some of the micro-auctions may repeat periodically less than once per year, less than once per quarter, less than once per month, less than once per week, or less than once per day. Alternatively, in an embodiment, the radio spectrum bidding application 122 is responsible for accessing the data store 118 and to read details of forthcoming radio spectrum micro-auctions.

The radio spectrum bidding application 122 analyzes terms and conditions of forthcoming radio spectrum micro-auctions, analyzes recent wireless communication traffic loads, develops bids for a plurality of the radio spectrum micro-auctions, transmits the bids to the micro-auction system 114 and/or to the data store 118, and receives information on the results of the radio spectrum micro-auctions. In an embodiment, the radio spectrum bidding application 122 establishes an end-to-end trusted communication link between the bidder system 120 and the data store 118 before transmitting the bids and transmits the bids and receives results via the end-to-end trusted communication link.

The radio spectrum bidding application 122 may analyze a history of bids and bid results that it maintains in its own bid history data store 134 or that it accesses from the data store 118, both history of its own proper bids and history of the bids of competing bidder systems 120 associated with different wireless communication service providers. The radio spectrum bidding application 122 may analyze a history of wireless communication traffic on its cell sites 104 in its radio spectrum licenses to determine and/or project a wireless communication traffic demand during the next cycle of radio spectrum license allocation. The radio spectrum bidding application 122 can perform this analysis for each different cell site 104, if this accords with the partitioning scheme of the RAN areas associated with the radio spectrum license allocations. The analysis may comprise an analysis of the subscription fees paid by wireless communication devices 101 in the history of wireless communication traffic on its cell sites 104 that takes into consideration distributed capital expense costs distributed to the cell sites 104. These analyses can take into consideration windowed average statistics that emphasize recent history of wireless communication traffic, bids, micro-auction results to better track a current operating context.

It is contemplated that such analysis can allow the wireless communication service provider to bid just enough to win just enough micro-auctions to provide just enough capacity to carry the current wireless communication traffic load without any spare capacity. This is possible because the wireless communication service provider will not be "stuck" if traffic load exceeds its capacity. This error can be corrected in the next micro-auction bidding cycle. In this way the wireless communication service provider can bid more efficiently and not pay for radio spectrum license allocation that it does not actually need, at least does not need right now. The bidding analysis can take into consideration temporary outages of cell sites 104, so that the wireless communication service provider may not be paying for radio spectrum license allocation in a specific usage area that it cannot temporarily make use of.

The radio spectrum bidding application 122 may use a rules engine to determine its micro-auction bids based on the analysis described above. The rules engine may comprise business rules that relate to service level agreements (SLAs) it may have entered into with some subscribers. The rules engine may further comprise business rules that promote achievement of strategic business objectives, such as increasing a market share in a first usage area and/or reducing presence in a second usage area.

The rules engine may include rules that prevent bidding for radio spectrum that a wireless communication service provider and/or mobile network operator (MNO) or virtual mobile network operator (MVNO) does not have RAN infrastructure to support. Said in other words, if an operator is not currently able to carry wireless service on frequency band X, the radio spectrum bidding application 122 may have a rule which prevents that operator for bidding on a license in frequency band X. This may seem a ludicrous scenario, but in an environment of rapidly shifting radio spectrum frequency band definitions and shifting relationships among MVNOs and traditional wireless communication service providers who actually own RAN infrastructure, this is not an unlikely scenario (e.g., bidding and winning a license for a frequency band that the operator cannot possibly support). The rules that prevent bidding on unsupported radio spectrum may execute by reading a data table that identifies the frequency bands supported for the bidder/operator. This data table may define frequency bands and specific telecommunications protocols supported on those frequency bands.

In an embodiment, the wireless communication service providers that operate the bidder systems 120 maintain a funds deposit account that is accessible to the radio spectrum allocation authority 112. The radio spectrum allocation authority 112 transfers funds from the deposit accounts of the wireless communication service providers to collect on micro-auctions won by the bidder systems 120. As micro-auctions are completed and micro-auction results are promulgated, the radio spectrum bidding application 122, or another application executing on a computer system in the domain of the wireless communication service providers, may incrementally deposit additional funds in its deposit account based on micro-auctions it has won.

During the bid evaluation process, the micro-auction application 116 analyzes each bid first to determine if the associated deposit account has adequate funds to cover the offered bid. If the deposit account is below a predefined threshold, the bid is deemed invalid and is not considered in determining a winner of that micro-auction. The micro-auction application 116 may send notification to the spectrum bidding application 122 of the lack of funds in the associated deposit account. Micro-auction application 116 may further qualify bids based on a regulatory compliance history of the wireless communication service provider associated with each of the bids. The micro-auction application 116 may deem bids offered by service providers that have a non-compliance record to be invalid and not enter the bids in any micro-auctions.

The micro-auction application 116 may store micro-auction bids and results of micro-auctions in the data store 118. Alternatively, the radio spectrum bidding applications 122 may submit their bids directly to the data store 118, and the micro-auction application 116 may retrieve the bids from the data store 118 to determine winners of the micro-auctions. Records of the bids and records of the micro-auction results may be stored in a blockchain or a hyperledger form in the data store 118. Storing this information in a blockchain or hyperledger can provide both transparency and confidence that the bids and results may not be tampered with. Blockchains are deemed to be tamperproof or tamper resistant, and consequently both wireless communication service providers and the radio spectrum allocation authority 112 can justifiably and prudently be assured of the integrity of bidding and micro-auction results stored in the data store 118. In some contexts the data store 118 may be referred to as a trusted data store. In addition to the elevated trust and confidence associated with the data store 118 because of utilization of blockchain technology and techniques, the data store 118 may further be considered to be a trusted data store because communications with the data store 118 are conducted via end-to-end trusted communication links.

On the completion of a radio spectrum micro-auction, an affiliation list server 130 executing a RAN affiliation list builder application 132 may analyze the results of the micro-auctions and build a plurality of RAN affiliation lists 105. The RAN affiliation list builder application 132 may then promulgate these RAN affiliation lists 105 to each of the cell sites 104 in the RAN areas 102, 106, 108. It is noted that the RAN affiliation list builder application 132 does not send all RAN affiliation lists 105 to each cell site 104, rather it sends the single applicable RAN affiliation list 105 applicable to each different cell site 104. For example, the RAN affiliation list builder application 132 sends a first RAN affiliation list 105 associated with the first RAN area 102 to the cell sites 104 located in the first RAN area 102; the RAN affiliation list builder application 132 sends a second RAN affiliation list 105 associated with the second RAN area 106 to the cell sites 104 located in the second RAN area 106, and the RAN affiliation list builder application 132 sends a third RAN affiliation list 105 associated with the third RAN area 108 to the cell sites 104 located in the third RAN area 108, where the first, second, and third RAN affiliation lists are each different from each other.

Figure 2:
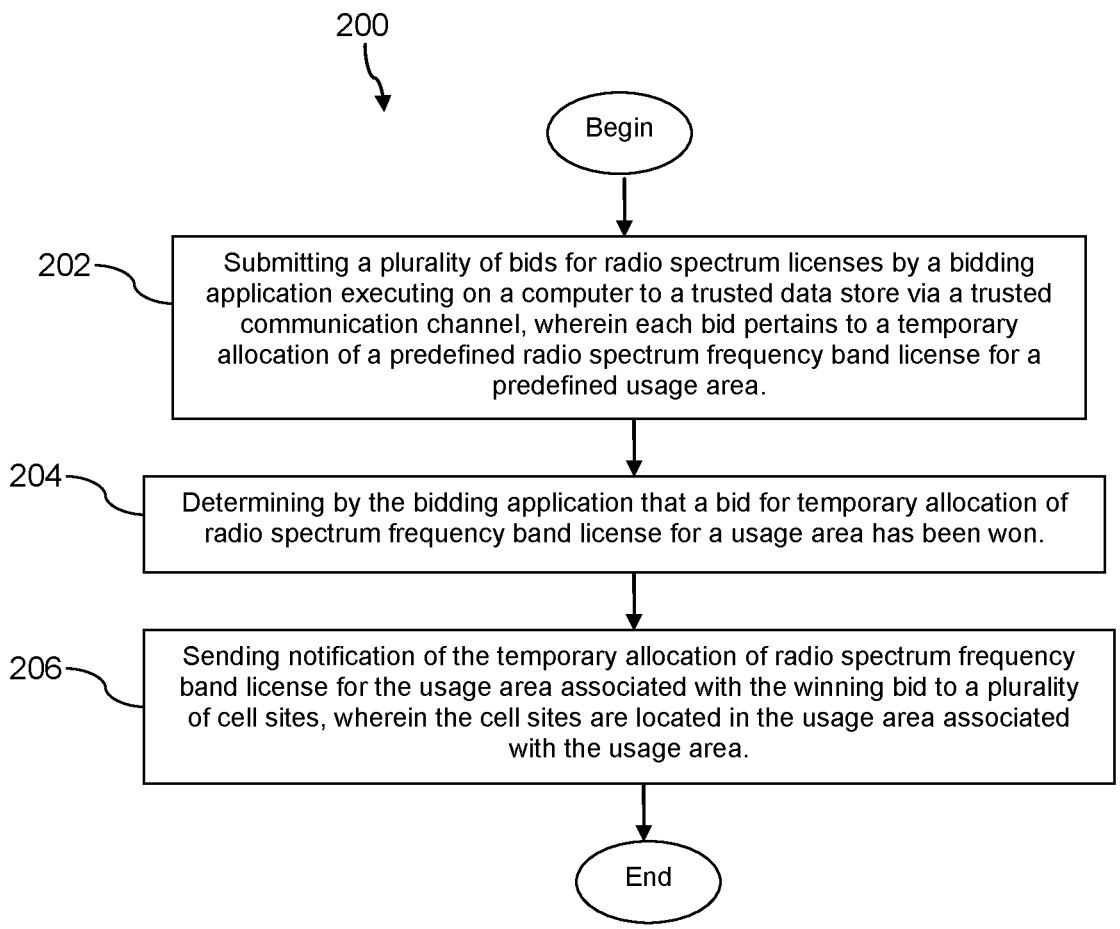
FIG. 2 is a flow chart of a method according to an embodiment of the disclosure.

Turning now to FIG. 2, a flow chart 200 is described. In an embodiment, method 200 is a method of bidding for a plurality of radio spectrum licenses in a plurality of radio spectrum license micro-auctions. At block 202, the method 200 comprises submitting a plurality of bids for a radio spectrum license by a bidding application executing on a computer to a trusted data store via a trusted communication channel, wherein each bid pertains to a temporary allocation of a predefined radio spectrum frequency band license for a predefined usage area. In an embodiment, each predefined usage areas is defined in terms of a single state boundary, a single county boundary, a single township boundary, or a single city boundary.

At block 204, the method 200 comprises determining by the application that a bid for temporary allocation of radio spectrum frequency band license for a usage area has been won. In an embodiment, determining that a bid has been won comprises the bidding application reading the result of the bid from the trusted data store via the trusted communication channel.

At block 206, the method 200 comprises sending notification of the temporary allocation of radio spectrum frequency band license for the usage area associated with the winning bid to a plurality of cell sites, wherein the cell sites are located in the usage area associated with the usage area. In an embodiment, the notification is sent to the cell sites by the bidding application. Alternatively, in an embodiment, the notification is sent to the cell sites by the micro-auction application 116.

In an embodiment, the method 200 further comprises monitoring by the bidding application a deposit account balance maintained by a wireless communication service provider associated with the computer on which the bidding application executes; and sending a notification to the wireless communication service provider by the bidding application to deposit additional funds in the deposit account balance, wherein the notification comprises a future time at which the bidding application projects the deposit account will drop below a predefined deposit account balance threshold qualification for bidding for radio spectrum licenses. In an embodiment, the method 200 further comprises analyzing a history of micro-auctions by the bidding application, analyzing by the bidding application a history of wireless communication traffic on cell sites operated by a wireless communication service provider associated with the computer on which the bidding application executes, projecting a wireless communication traffic demand during a next radio spectrum license allocation period by the bidding application, and creating the plurality of bids for radio spectrum licenses by the bidding application based on the analyzing the history of micro-auctions, based on the analyzing of the history of wireless communication traffic, and based on the projecting the wireless communication traffic. In an embodiment, the method 200 further comprises executing rules to evaluate a capability to support communication on a frequency band and that prevent bidding for radio spectrum that the wireless communication service provider or MNO or VMNO does not have RAN infrastructure to support.

Figure 3:
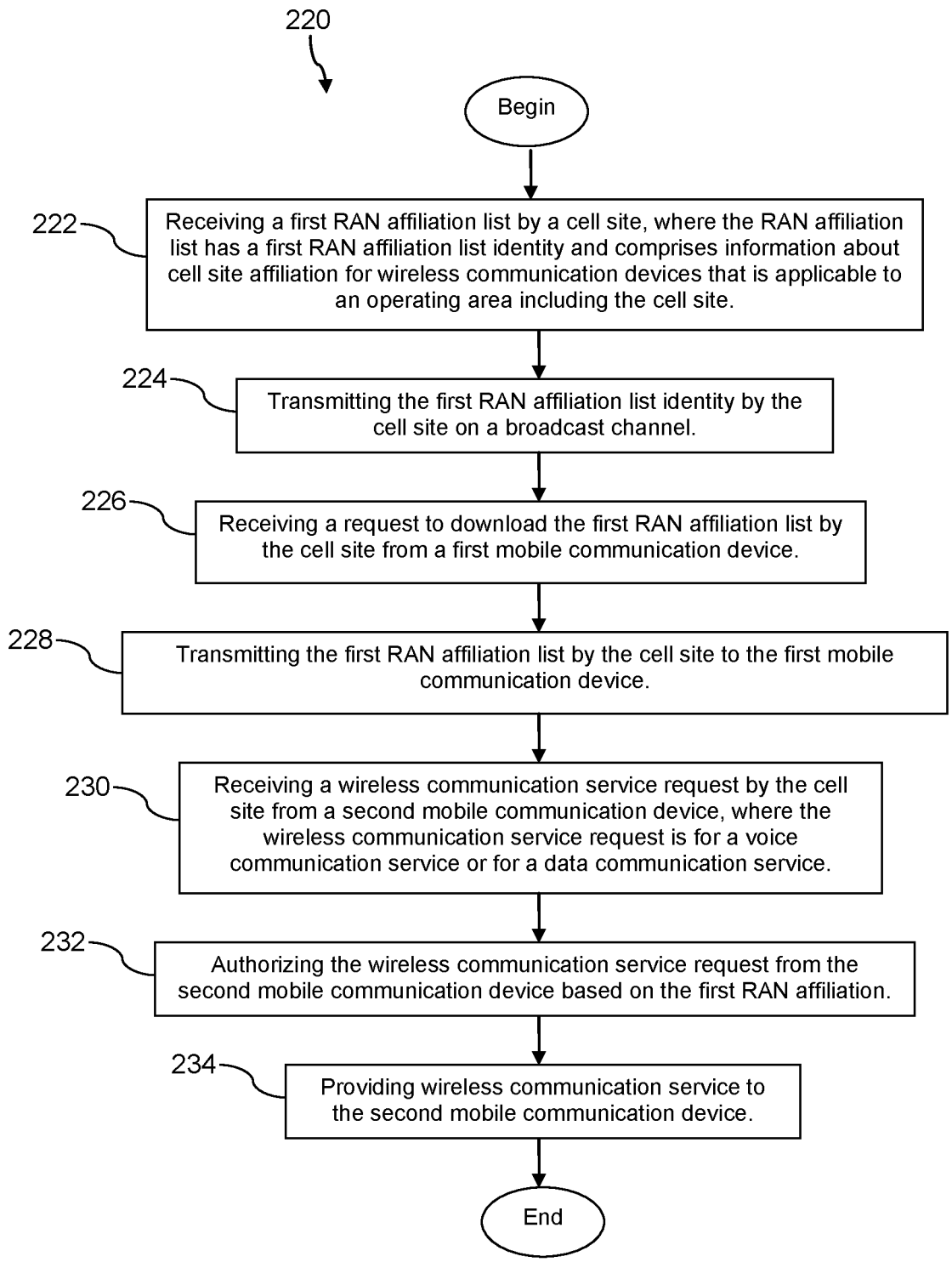
FIG. 3 is a flow chart of another method according to an embodiment of the disclosure.

Turning now to FIG. 3, a method 220 is described. In an embodiment, the method 220 is a method of propagating a radio access network (RAN) affiliation list to mobile communication devices, where the RAN affiliation list informs the mobile communication devices what cell site they are to attach to and what radio frequencies they are to use. At block 222, the method 220 comprises receiving a first RAN affiliation list by a cell site, where the RAN affiliation list has a first RAN affiliation list identity and comprises information about cell site affiliation for wireless communication devices that is applicable to an operating area including the cell site.

At block 224, the method 220 comprises transmitting the first RAN affiliation list identity by the cell site on a broadcast channel. At block 226, the method 220 comprises receiving a request to download the first RAN affiliation list by the cell site from a first mobile communication device.

At block 228, the method 220 comprises transmitting the first RAN affiliation list by the cell site to the first mobile communication device. At block 230, the method 220 comprises receiving a wireless communication service request by the cell site from a second mobile communication device, where the wireless communication service request is for a voice communication service or for a data communication service.

At block 232, the method 220 comprises authorizing the wireless communication service request from the second mobile communication device based on the first RAN affiliation list. At block 234, the method 220 comprises providing wireless communication service to the second mobile communication device.

Figure 4:
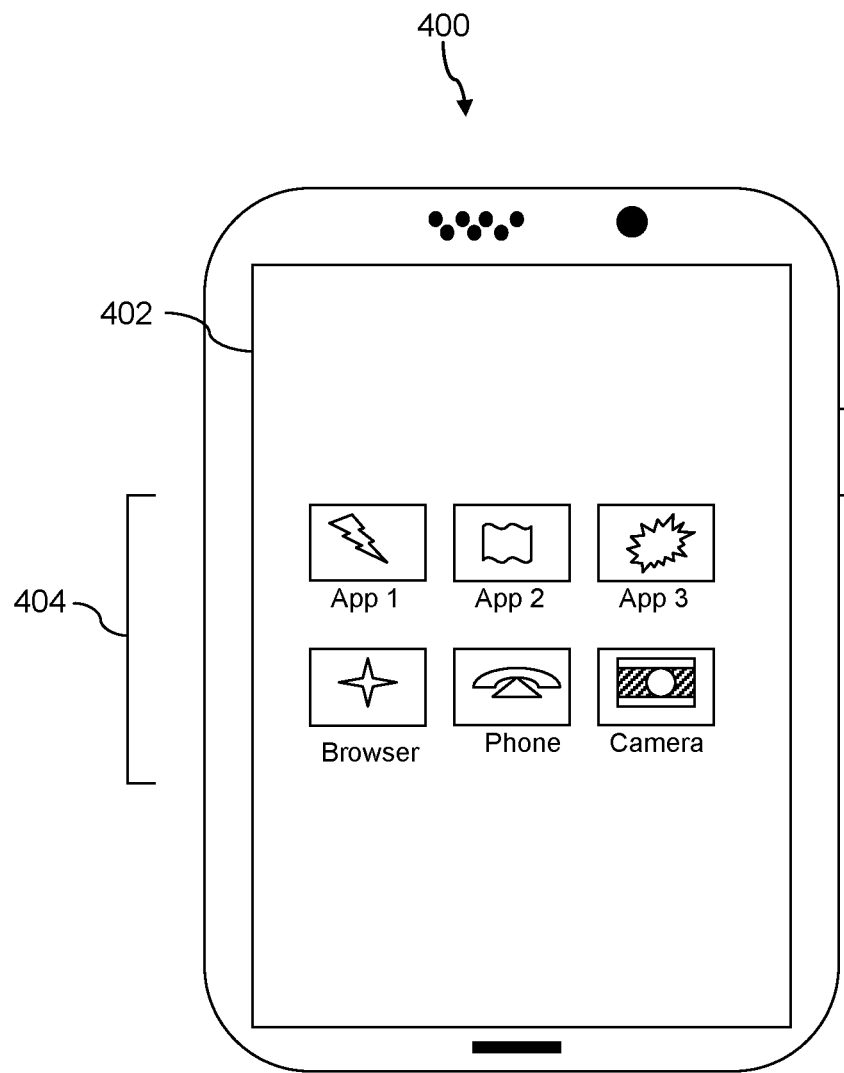
FIG. 4 is an illustration of a mobile communication device according to an embodiment of the disclosure.

FIG. 4 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
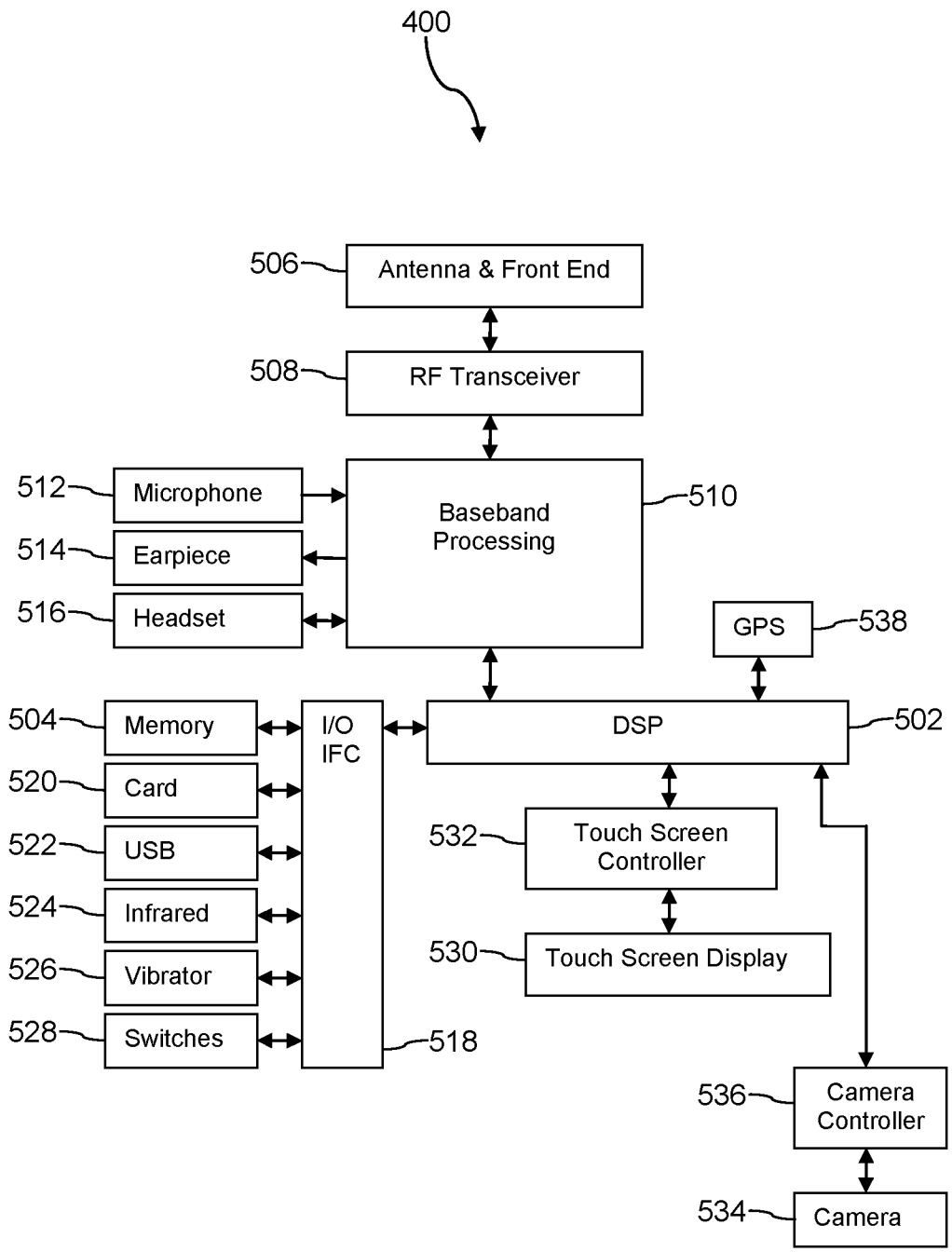
FIG. 5 is a block diagram of a hardware architecture of a mobile communication device according to an embodiment of the disclosure.

FIG. 5 shows a block diagram of the UE 400. While a variety of known components of handsets are depicted, in an embodiment a subset of the listed components and/or additional components not listed may be included in the UE 400.

The UE 400 includes a digital signal processor (DSP) 502 and a memory 504. As shown, the UE 400 may further include one or more antenna and front end unit 506, a one or more radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen display 530, a touch screen controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a long term evolution (LTE), a code division multiple access (CDMA), a global system for mobile communications (GSM) wireless communication protocol. In an embodiment, one of the radio transceivers 508 may comprise a near field communication (NFC) transceiver. The NFC transceiver may be used to complete payment transactions with point-of-sale terminals or other communications exchanges. In an embodiment, each of the different radio transceivers 508 may be coupled to its own separate antenna. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
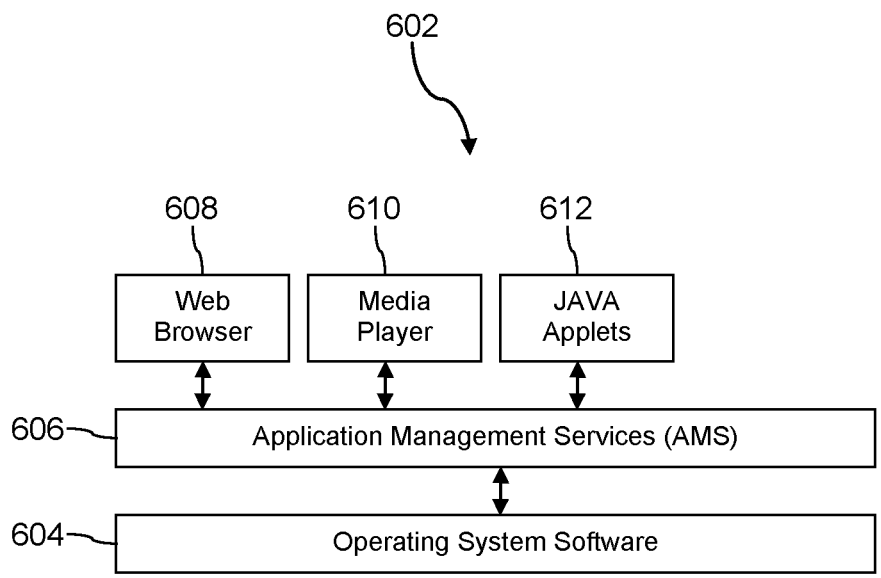
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 6B:
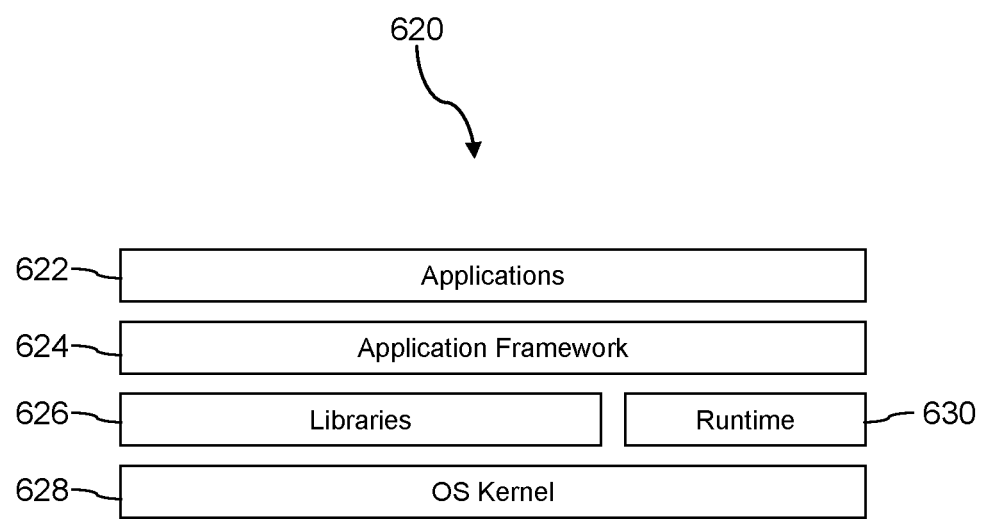
FIG. 6B is a block diagram of a software architecture of a mobile communication device according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
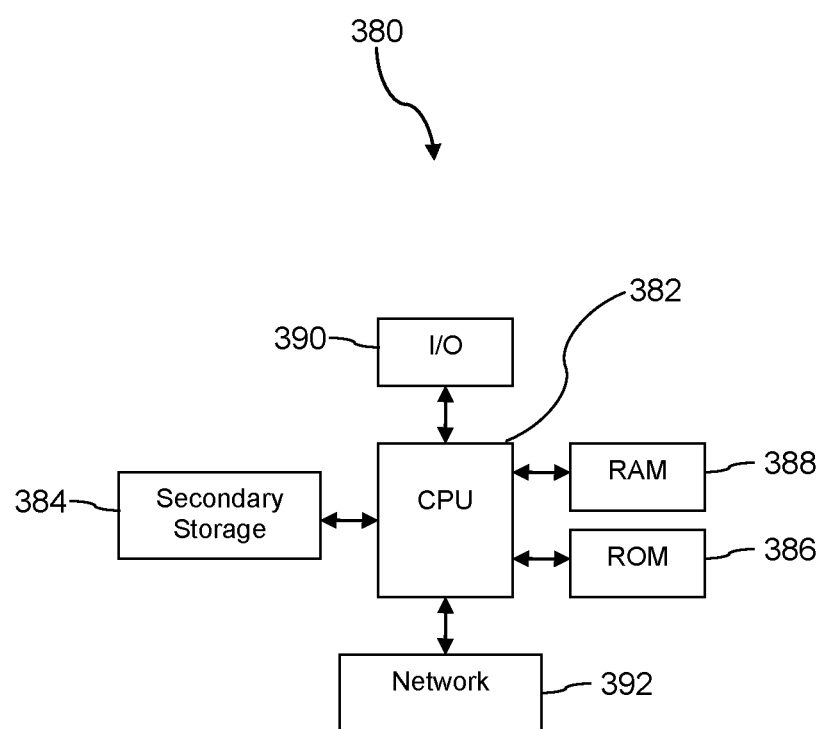
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wave division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

The following are embodiments in accordance with the present disclosure. In a first embodiment, a computer system for managing a plurality of radio spectrum license micro-auctions comprises a trusted data store comprising a record of auction bids and auction results for a plurality of micro-auctions of radio spectrum licenses, where each micro-auction pertains to a temporary allocation of a predefined radio spectrum frequency band license for a predefined usage area; a processor; a non-transitory memory; and a radio spectrum license micro-auction application stored in the non-transitory memory that, when executed by the processor, for each different micro-auction, retrieves bids stored in the trusted data store associated with the micro-auction, for each bid, determining that a bidder associated with the bid has funds on deposit in a depository sufficient to cover the bid, for each different micro-auction determines a bid winner, for each bid winner, debits the funds on deposit associated with the bid winner in the amount of the winning bid, and for each micro-auction stores a record of the bid winner in the trusted data store, whereby a wireless communication service provider is notified of having won the micro-auction by reading the record of the bid winner from the trusted data store. In a second embodiment, the trusted data store of the first embodiment can store the record of auction bids and auction results in a blockchain. In a third embodiment, communications between the computer system and bidders to the radio spectrum license micro-auctions of the first embodiment or of the second embodiment can be conducted via end-to-end trusted communication links. In a fourth embodiment, at least some of the micro-auctions of the first embodiment, of the second embodiment, or of the third embodiment can repeat periodically less than once per year, less than once per quarter, less than once per month, less than once per week, or less than once per day. In a fifth embodiment, the radio spectrum license micro-auction application of the first embodiment, of the second embodiment, of the third embodiment, or of the fourth embodiment can send announcements of forthcoming radio spectrum license micro-auctions, wherein the announcements can define when the bidding process of a micro-auction opens, when the bidding process of a micro-auction closes, when the result of the micro-auction is deemed active, what usage area is covered by the micro-auction, and what radio spectrum frequency band is covered by the micro-auction. In a sixth embodiment, the announcements of the fifth embodiment can identify a repeating period of the micro-auctions. In a seventh embodiment, the radio spectrum license micro-auction application of the first embodiment, of the second embodiment, of the third embodiment, of the fourth embodiment, of the fifth embodiment, or of the sixth embodiment can send micro-auction results to cell sites, and cell sites broadcast results of the micro-auctions that pertain to it.

In an eighth embodiment, a method of bidding for a plurality of radio spectrum licenses in a plurality of radio spectrum license micro-auctions comprises submitting a plurality of bids for radio spectrum licenses by a bidding application executing on a computer to a trusted data store via a trusted communication channel, wherein each bid pertains to a temporary allocation of a predefined radio spectrum frequency band license for a predefined usage area; determining by the bidding application that a bid for temporary allocation of radio spectrum frequency band license for a usage area has been won; and sending notification of the temporary allocation of radio spectrum frequency band license for the usage area associated with the winning bid by the bidding application to a plurality of cell sites, wherein the cell sites are located in the usage area associated with the usage area. In a ninth embodiment, at least some of the micro-auctions of the eighth embodiment can repeat periodically less than once per year, less than once per quarter, less than once per month, less than once per week, or less than once per day. In a tenth embodiment, each predefined usage area of the eighth embodiment or of the ninth embodiment can be defined in terms of a single state boundary, a single county boundary, a single township boundary, or a single city boundary. In an eleventh embodiment, the method of the eighth embodiment, of the ninth embodiment, or of the tenth embodiment can comprise monitoring by the bidding application a deposit account balance maintained by a wireless communication service provider associated with the computer on which the bidding application executes; and sending a notification to the wireless communication service provider by the bidding application to deposit additional funds in the deposit account balance, wherein the notification can comprise a future time at which the bidding application projects the deposit account will drop below a predefined deposit account balance threshold qualification for bidding for radio spectrum licenses. In a twelfth embodiment, the action of determining that a bid has been won of the eight embodiment, of the ninth embodiment, of the tenth embodiment, or of the eleventh embodiment can comprise the bidding application reading the result of the bid from the trusted data store via the trusted communication channel. In a thirteenth embodiment, the method of the eighth embodiment, of the ninth embodiment, of the tenth embodiment, of the eleventh embodiment, or of the twelfth embodiment can comprise analyzing a history of micro-auctions by the bidding application; analyzing by the bidding application a history of wireless communication traffic on cell sites operated by a wireless communication service provider associated with the computer on which the bidding application executes; projecting a wireless communication traffic demand during a next radio spectrum license allocation period by the bidding application; and creating the plurality of bids for radio spectrum licenses by the bidding application based on the analyzing the history of micro-auctions, based on the analyzing of the history of wireless communication traffic, and based on the projecting the wireless communication traffic.

In a fourteenth embodiment, a computer system for bidding for a plurality of radio spectrum licenses in a plurality of radio spectrum license micro-auctions comprises a processor; a non-transitory memory; and a bidding application stored in the non-transitory memory that, when executed by the processor, evaluates current wireless communication traffic loads in a plurality of different usage areas, projects a demand for wireless communication service in the usage areas in a next radio spectrum license allocation period based on evaluating the current wireless communication traffic loads, for each of a plurality of different radio spectrum license micro-auctions associated with the usage areas, determines a bid for the radio spectrum license micro-auction based on projecting the demand for wireless communication service in the usage area, sends the bids for the radio spectrum license micro-auctions to a radio spectrum license micro-auction system, retrieves results of the bids for the radio spectrum license micro-auctions from the radio spectrum license micro-auction system, and sends notification of radio spectrum license allocations associated with the usage areas based on the results of the bids for the radio spectrum license micro-auctions to a plurality of cell sites. In a fifteenth embodiment, the bidding application of the fourteenth embodiment can analyze a history of micro-auctions, and wherein determining a bid by the bidding application is further based on analyzing the history of micro-auctions. In a sixteenth embodiment, the bidding application of the fifteenth embodiment can receive announcements of forthcoming radio spectrum license micro-auctions from the radio spectrum license micro-auction system, wherein the announcements can define when the bidding process of a micro-auction opens, when the bidding process of a micro-auction closes, when the result of the micro-auction is deemed active, what usage area is covered by the micro-auction, and what radio spectrum frequency band is covered by the micro-auction, and wherein determining the bid by the bidding application is further based on the announcements of forthcoming radio spectrum license micro-auctions. In a seventeenth embodiment, the bidding application of the fourteenth embodiment, of the fifteenth embodiment, or of the sixteenth embodiment can establish an end-to-end trusted communication link between the computer system and a data store of the radio spectrum license micro-auction system and can send the bids to the data store via the end-to-end trusted communication link. In an eighteenth embodiment, the radio spectrum license allocation period of the bidding application of the fourteenth embodiment, of the fifteenth embodiment, of the sixteenth embodiment, or of the seventeenth embodiment can be less than one year. In a nineteenth embodiment, the radio spectrum license allocation period of the bidding application of the fourteenth embodiment, of the fifteenth embodiment, of the sixteenth embodiment, or of the seventeenth embodiment can be less than one month. In a twentieth embodiment, the radio spectrum license allocation period of the bidding application of the fourteenth embodiment, of the fifteenth embodiment, of the sixteenth embodiment, or of the seventeenth embodiment can be less than one week.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of propagating a radio access network (RAN) affiliation list to mobile communication devices, where the RAN affiliation list informs the mobile communication devices what cell site they are to attach to and what radio frequencies they are to use, comprising:
  receiving a first RAN affiliation list by a cell site, where the first RAN affiliation list has a first RAN affiliation list identity and comprises information about cell site affiliation for mobile communication devices that is applicable to an operating area including the cell site;
  transmitting the first RAN affiliation list identity by the cell site on a broadcast channel;
  receiving a request to download the first RAN affiliation list by the cell site from a first mobile communication device;
  transmitting the first RAN affiliation list by the cell site to the first mobile communication device;
  receiving a wireless communication service request by the cell site from a second mobile communication device, where the wireless communication service request is for a voice communication service or for a data communication service;
  authorizing the wireless communication service request from the second mobile communication device based on the first RAN affiliation list; and
  providing wireless communication service by the cell site to the second mobile communication device.

2. The method of claim 1, wherein the first RAN affiliation list is received by the cell site via an end-to-end trusted communication link.

3. The method of claim 1, wherein the first RAN affiliation list is received by the cell site from a RAN affiliation list server executing a RAN affiliation list builder application.

4. The method of claim 1, wherein the cell site provides wireless communication service to the second mobile communication device according to a 5G, a long term evolution (LTE), a code division multiple access (CDMA), or a global system for mobile communications (GSM) wireless communication protocol.

5. The method of claim 1, wherein the first mobile communication device is one of a mobile phone, a personal digital assistant (PDA), a smart phone, a wearable computer, a headset computer, a laptop computer, a notebook computer, or a tablet computer.

6. The method of claim 1, wherein the first RAN affiliation list comprises information about cell site in the operating area associated with different wireless communication service providers.

7. The method of claim 6, wherein the first RAN affiliation list associates each cell site identity to an associated wireless communication service provider identity.

8. The method of claim 1, wherein the first RAN affiliation list associates each cell site identity to frequencies the associated cell site is licensed to operate on.

9. A cell site for propagating a radio access network (RAN) affiliation list to mobile communication devices, where the RAN affiliation list informs the mobile communication devices what cell site they are to attach to and what radio frequencies they are to use, comprising:
  a radio transceiver coupled to the antenna;
  a processor coupled to the radio transceiver;
  a non-transitory memory coupled to the processor; and
  an application stored in the non-transitory memory that, when executed by the processor:
    receives a first RAN affiliation list, where the first RAN affiliation list has a first RAN affiliation list identity and comprises information about cell site affiliation for wireless communication devices that is applicable to an operating area including the cell site;
    transmits the first RAN affiliation list identity via the radio transceiver on a broadcast channel;
    receives a request to download the first RAN affiliation list via the radio transceiver from a first mobile communication device;
    transmits the first RAN affiliation list via the radio transceiver to the first mobile communication device;
    receives a wireless communication service request via the radio transceiver from a second mobile communication device, where the wireless communication service request is for a voice communication service or for a data communication service;
    authorizes the wireless communication service request from the second mobile communication device based on the first RAN affiliation list; and
    provides wireless communication service via the radio transceiver to the second mobile communication device.

10. The cell site of claim 9, wherein the radio transceiver provides wireless communication service to the second mobile communication device according to a 5G, a long term evolution (LTE), a code division multiple access (CDMA), or a global system for mobile communications (GSM) wireless communication protocol.

11. The cell site of claim 9, wherein the first mobile communication device is one of a mobile phone, a personal digital assistant (PDA), a smart phone, a wearable computer, a headset computer, a laptop computer, a notebook computer, or a tablet computer.

12. The cell site of claim 9, wherein the application transmits the first RAN affiliation list using less than 10% of the broadcast channel throughput capacity.

13. The cell site of claim 9, wherein the application further:
  receives a second RAN affiliation list, where the second RAN affiliation list has a second RAN affiliation list identity and comprises information about cell site affiliation for wireless communication devices applicable to the operating area including the cell site and that is different from the information of the first RAN affiliation list; and
  transmits the second RAN affiliation list identity via the radio transceiver on the broadcast channel.

14. The cell site of claim 9, wherein the processor establishes an end-to-end trusted communication link and receives the first RAN affiliation list via the end-to-end trusted communication link.

15. A mobile communication device, comprising:
  a radio transceiver;
  a non-transitory memory;
  a processor; and
  an application stored in the non-transitory memory that, when executed by the processor:
    monitors a broadcast channel of a first cell site via the radio transceiver,
    receives a first radio access network (RAN) affiliation list identity on the broadcast channel of the first cell site via the radio transceiver,
    determines that the non-transitory memory does not store a RAN affiliation list associated with the first RAN affiliation list identity, sends a request for a RAN affiliation list associated with the first RAN affiliation list identity via the radio transceiver to the first cell site, receives a first RAN affiliation list associated with the first RAN affiliation list identity via the radio transceiver from the first cell site, stores the first RAN affiliation list in the non-transitory memory, and initiates wireless communication between the radio transceiver and the first cell site based on the first RAN affiliation list.

16. The mobile communication device of claim 15, wherein communication device is one of a mobile phone, a personal digital assistant (PDA), a smart phone, a wearable computer, a headset computer, a laptop computer, a notebook computer, or a tablet computer.

17. The mobile communication device of claim 15, wherein the radio transceiver established wireless communication links with a cell site according to a 5G, a long term evolution (LTE), a code division multiple access (CDMA), or a global system for mobile communications (GSM) wireless communication protocol.

18. The mobile communication device of claim 15, wherein the first RAN affiliation list comprises a first RAN affiliation list identity and comprises information associating each of a plurality of cell sites with a wireless communication service provider that operates the cell site and the frequencies the cell site is licensed to use, where the plurality of cell sites are located within the same RAN area.

19. The mobile communication device of claim 18, wherein the first RAN affiliation list comprises information about cell sites operated by different wireless communication service providers.

20. The mobile communication device of claim 19, wherein the application further:

monitors a broadcast channel of a second cell site via the radio transceiver, receives a second radio access network (RAN) affiliation list identity on the broadcast channel of the second cell site via the radio transceiver, determines that the non-transitory memory does store a RAN affiliation list associated with the second RAN affiliation list identity, and initiates wireless communication between the radio transceiver and the second cell site based on a second RAN affiliation list.

* * * * *